United States Patent [19]
Oda et al.

[11] Patent Number: 6,117,919
[45] Date of Patent: Sep. 12, 2000

[54] ANTI-FOGGING ARTICLE AND COMPOSITION FOR FORMING ANTI-FOGGING COATING FILM

[75] Inventors: Mihoko Oda, Ushiku; Teigo Sakakibara, Yokohama; Shunichiro Nishida, Yokohama; Hideo Ukuda, Yokohama, all of Japan

[73] Assignees: Canon Kasei Kabushiki Kaisha, Ibaraki-ken; Canon Kabushiki Kaisha, Tokyo, both of Japan

[21] Appl. No.: 09/119,404

[22] Filed: Jul. 21, 1998

[30] Foreign Application Priority Data

Jul. 31, 1997 [JP] Japan .................................. 9-206102

[51] Int. Cl.⁷ .................................. C08G 8/02; C08J 3/28
[52] U.S. Cl. .................................. 522/33; 522/8; 523/169
[58] Field of Search .................... 522/33, 8; 523/169

[56] References Cited

U.S. PATENT DOCUMENTS 5,244,935 9/1993 Oshibe et al. .............................. 522/33
5,798,407 8/1998 Yano et al. ................................ 525/77

*Primary Examiner*—James J. Seidleck
*Assistant Examiner*—Olga Asinovsky

*Attorney, Agent, or Firm*—Fitzpatrick, Cella, Harper & Scinto

[57] ABSTRACT

Disclosed herein is an anti-fogging coating film comprising a hydrophilic polymer and a benzophenone compound represented by a general formula (I):

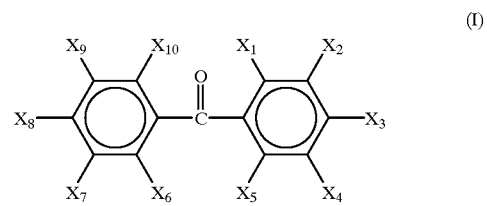

wherein $X_1$ to $X_{10}$ are the same or different from one another and are individually a radical selected from the group consisting of hydrogen, hydroxyl group, sulfonic group, carboxyl group, acyl group, ester group, ether group, hydrocarbon groups, alkoxyl groups having 1 to 6 carbon atoms, amino group, hydroxyalkyl groups and hydroxyalkoxyl groups, with the proviso that at least one of $X_1$ to $X_{10}$ is a radical selected from among the hydroxyl and sulfonic groups. Anti-fogging articles comprising a base material such as glass, plastic, metal or mirror and the anti-fogging coating film provided thereon, and a composition for forming the anti-fogging coating film are also disclosed.

10 Claims, No Drawings

ANTI-FOGGING ARTICLE AND COMPOSITION FOR FORMING ANTI-FOGGING COATING FILM

BACKGROUND OF THE INVENTION

1. Field of the Invention

The present invention relates to an anti-fogging coating film having excellent weather resistance, transparency and adhesion to a base material, anti-fogging articles comprising a base material such as glass, plastic, metal or mirror and the anti-fogging coating film provided thereon, and a composition for forming the anti-fogging coating film.

2. Related Background Art

The weak point of articles making use of a base material such as glass, plastic, metal or mirror is that fine waterdrops adhere to their surfaces when they are used at a high-temperature and high-humidity place or in an environment with large temperature or humidity variations, and so they are fogged up.

A known method for inhibiting fogging consists of forming an anti-fogging layer containing a hydrophilic polymer on the surface of glass, plastics, metal, mirror, etc., with the hydrophilic polymer including polyvinyl alcohol, polyethylene-imine, polyvinyl butyral, etc.

An anti-fogging layer containing a hydrophilic polymer has poor water resistance and undergoes deterioration by sunlight and hence creates a problem of weather resistance. On the other hand, it has been known to coat a base material with a composition containing colloidal silica and a surfactant as a method for enhancing water resistance. However, such a method has involved problems with transparency and the anti-fogging property.

It is also known to add an ultraviolet absorbent such as a benzotriazole compound for the purpose of improving the weather resistance. However, such a method deteriorates transparency and so on, though the weather resistance is improved.

As described above, in such prior art techniques, an anti-fogging coating film having high water resistance and satisfactory weather resistance and transparency has not been yet obtained.

SUMMARY OF THE INVENTION

It is an object of the present invention is to provide an anti-fogging coating film having excellent weather resistance and transparency, an article coated with such an anti-fogging coating film, and a composition for forming the anti-fogging coating film.

The above object can be achieved by the present invention described below.

According to the present invention, there is thus provided an anti-fogging coating film comprising a hydrophilic polymer and a benzophenone compound represented by a general formula (I):

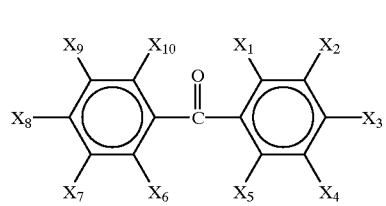

wherein $X_1$ to $X_{10}$ may be the same or different from one another and are individually a radical selected from the group consisting of hydrogen, hydroxyl group, sulfonic group, carboxyl group, acyl group, ester group, ether group, hydrocarbon groups, alkoxyl groups having 1 to 6 carbon atoms, amino group, hydroxyalkyl groups and hydroxyalkoxyl groups, with the proviso that at least one of $X_1$ to $X_{10}$ is a radical selected from among the hydroxyl and sulfonic groups.

According to the present invention, there is also provided an anti-fogging article comprising a base material of glass and the above-described anti-fogging coating film provided thereon.

According to the present invention, there is further provided an anti-fogging article comprising a base material of plastic and the above-described anti-fogging coating film provided thereon.

According to the present invention, there is still further provided an anti-fogging article comprising a base material of metal and the above-described anti-fogging coating film provided thereon.

According to the present invention, there is yet still further provided a composition for forming the above-described anti-fogging coating film, comprising a hydrophilic polymer and a benzophenone compound represented by a general formula (I):

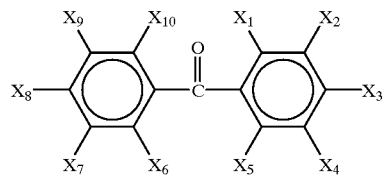

wherein $X_1$ to $X_{10}$ are the same or different from one another and are individually a radical selected from the group consisting of hydrogen, hydroxyl group, sulfonic group, carboxyl group, acyl group, ester group, ether group, hydrocarbon groups, alkoxyl groups having 1 to 6 carbon atoms, amino group, hydroxyalkyl groups and hydroxyalkoxyl groups, with the proviso that at least one of $X_1$ to $X_{10}$ is a radical selected from among the hydroxyl and sulfonic groups.

The anti-fogging coating film according to the present invention has not only excellent weather resistance, but also has excellent transparency and water resistance and moreover, is very superior in adhesion to a base material. The excellent weather resistance is principally attributable to the action of the benzophenone compound as both ultraviolet absorbent and radical scavenger. It is considered that this action is exhibited due to the fact that the benzophenone compound is finely dispersed or dissolved in the hydrophilic polymer matrix because the benzophenone compound has excellent compatibility with the hydrophilic polymer. At the same time, the transparency of the coating film is also maintained. The interaction between the benzophenone compound and the hydrophilic polymer is considered to also contribute to the enhancement of adhesion between the coating film and the base material, and water resistance. The weather resistance of the anti-fogging coating film is further enhanced by including a 2,2,6,6-tetramethyl-4-piperidine type hindered amine compound together with the benzophenone compound.

DETAILED DESCRIPTION OF THE PREFERRED EMBODIMENTS

Examples of the hydrophilic polymer useful in the practice of the present invention include organic polymeric compounds such as polyvinyl alcohol, polyvinyl butyral, polyethylene glycol, polyvinyl ether, polyvinyl acetate, polyvinyl pyrrolidone, polyethyleneimine, polyacrylamide, polyacrylic acid and polymethacrylic acid, and besides hydrolytic condensation products of inorganic alkoxides. These hydrophilic polymers may be used either singly or in any combination thereof. Copolymers of the hydrophilic polymers may also be used. Alternatively, their copolymers containing any other comonomer within limits not impeding the hydrophilicity may also be used.

It may also be possible to suitably incorporate a crosslinking agent, such as an aminoplast resin such as a melamine or urea aminoplast resin, or an epoxy resin.

Examples of the hydrocarbon groups which may be contained in the benzophenone compound represented by the general formula (I) used in the present invention include saturated aliphatic, unsaturated aliphatic, alicyclic and aromatic hydrocarbon groups. Those having 1 to 10 carbon atoms are preferred.

Benzophenone compounds in which at least one of $X_1$, $X_5$, $X_6$ and $X_{10}$ is a hydroxyl group are preferred.

Examples thereof include 2,2',4,4'-tetrahydroxybenzophenone, 2,4-dihydroxybenzophenone, 2-hydroxy-4-methoxy-5-sulfobenzophenone, 2-hydroxy-4-methoxybenzophenone and 2,2'-dihydroxy-4-methoxybenzophenone.

The benzophenone compound used herein is mixed into the hydrophilic polymer. Since the hydrophilic polymer is generally dissolved in water, an alcohol or a mixture thereof before its use, the benzophenone compound preferably has good solubility in water and/or alcohols, particularly, alcohols having at most 4 carbon atoms.

More specifically, the benzophenone compound preferably has solubility of at least 5% by weight (at 25° C.) in water or at least 5% by weight (at 25° C.) in alcohol, particularly, at least 10% by weight (at 25° C.) in methanol. As such a benzophenone compound, 2,2',4,4'-tetrahydroxybenzophenone is preferably used.

The amount of the benzophenone compound incorporated is within a range of from 0.01 to 10 parts by weight, preferably from 1 to 5 parts by weight, based on 100 parts by weight of the hydrophilic polymer.

Examples of the 2,2,6,6-tetramethyl-4-piperidine type hindered amine compound useful in the practice of the present invention include bis-[N-formyl-(2,2,6,6-tetramethyl-4-piperidyl)imino]hexamethylene, bis-(2,2,6,6-tetramethyl-4-piperidyl) sebacate and tetrakis-(2,2,6,6-tetramethyl-4-piperidyl) 1,2,3,4-butane-tetracarboxylate.

Of these, as with the benzophenone compound, those having good solubility in water and/or alcohols, particularly, alcohols having at most 4 carbon atoms are preferred. More specifically, the hindered amine compound preferably has solubility of at least 5% by weight (at 25° C.) in water or at least 5% by weight (at 25° C.) in alcohol, particularly, at least 10% by weight (at 25° C.) in methanol. As such a hindered amine compound, bis-[N-formyl-(2,2,6,6-tetramethyl-4-piperidyl)imino]-hexamethylene is preferably used.

The amount of the hindered amine compound incorporated is within a range of from 0.01 to 10 parts by weight, preferably from 1 to 5 parts by weight, based on 100 parts by weight of the hydrophilic polymer.

Anti-fogging articles having the anti-fogging coating film according to the present invention are obtained by coating a base material with a solution with a composition containing the above-described components dissolved in a solvent by an optional coating method such as spray coating, bar coating, roll coating, curtain flow coating, dip coating or spin coating and then drying the solution coated by heating.

As the solvent, any solvent may be used so far as it dissolves the composition. However, a solvent having good compatibility with water is generally used. Examples thereof include alcohols such as methanol, ethanol and isopropyl alcohol, ketones such as acetone and methyl ethyl ketone, ethers such as diethyl ether, glycols such as ethylene glycol and diethylene glycol and ethers thereof, and esters such as ethyl acetate. These solvents may be used either singly or in any combination thereof.

These solvents may also be blended with water.

The present invention will hereinafter be described more specifically by the following Examples and Comparative Examples.

EXAMPLE 1

Ten parts by weight of polyvinyl alcohol (number average polymerization degree: 2,000; saponification degree: 88% by mole) were dissolved in 100 parts by weight of water under heating. A solution with 0.5 parts by weight of hexamethoxymethylolmelamine, 0.05 parts by weight of ammonium p-toluenesulfonate and 0.3 parts by weight of 2,2',4,4'-tetrahydroxybenzophenone dissolved in 100 parts by weight of methanol was added to the above-prepared solution. The mixture was stirred at room temperature for 30 minutes.

A glass sheet was coated with the thus-obtained anti-fogging composition by dip coating and dried at 160° C. for 30 minutes to obtain an anti-fogging article.

EXAMPLE 2

An anti-fogging article was obtained in the same manner as in Example 1 except that 2-hydroxy-4-methoxy-4-sulfobenzophenone was used in place of 2,2',4,4'-tetrahydroxybenzophenone.

EXAMPLE 3

An anti-fogging article was obtained in the same manner as in Example 1 except that 2,4-dihydroxy-benzophenone was used in place of 2,2',4,4'-tetrahydroxy-benzophenone.

EXAMPLE 4

An anti-fogging article was obtained in the same manner as in Example 1 except that 0.3 parts by weight of bis-[N-formyl-(2,2,6,6-tetramethyl-4 -piperidyl)imino]-hexamethylene were additionally incorporated into the anti-fogging composition used in Example 1.

EXAMPLE 5

An anti-fogging article was obtained in the same manner as in Example 2 except that 0.3 parts by weight of bis(2,2, 6,6-tetramethyl-4-piperidyl) sebacate were additionally incorporated into the anti-fogging composition used in Example 2.

Comparative Example 1

An anti-fogging article was obtained in the same manner as in Example 1 except that 2-hydroxy-4-octoxybenzophenone was used in place of 2,2',4,4'-tetrahydroxybenzophenone.

Comparative Example 2

An anti-fogging article was obtained in the same manner as in Example 1 except that 2,2',4,4'-tetrahydroxybenzophenone was not added.

Comparative Example 3

An anti-fogging article was obtained in the same manner as in Example 1 except that 2-(2'-hydroxy-3'-t-butyl-5'-methylphenyl)-5-chlorobenzotriazole was used in place of 2,2',4,4'-tetrahydroxybenzophenone.

The articles obtained in Examples 1 to 5 and Comparative Examples 1 to 3 were evaluated in accordance with the following testing methods. The results are shown collectively in Table 1.

[Anti-fogging Property]

An anti-fogging article sample was placed 1 cm above the surface of hot water of 70° C. for 5 seconds to visually observe whether fogging occurred or not, thereby evaluating the sample as to the anti-fogging property in accordance with the following standard:

A: No fogging occurred;

B: Slight fogging occurred, but vanished at once;

C: Fogging occurred.

[Water Resistance]

After an anti-fogging article sample was immersed for 30 seconds in water of 20° C. and dried at 100° C. for 10 minutes, it was placed 1 cm above the surface of hot water of 70° C. for 5 seconds to visually observe whether fogging occurred or not, thereby evaluating the sample as to the water resistance in accordance with the following standard:

A: No fogging occurred;

B: Slight fogging occurred, but vanished at once;

C: Fogging occurred.

[Adhesion]

The surface of an anti-fogging article sample was reciprocatorily wiped 10 times with Silbon paper impregnated with water under a load of 100 g to visually observe the state of the coating film, thereby evaluating the sample as to the adhesion in accordance with the following standard:

A: No change occurred;

B: The coating film was partially separated;

C: The coating film was separated.

[Weather Resistance]

An anti-fogging article sample was exposed for 100 hours to ultraviolet light in a xenon long life weatherometer under conditions that the temperature of a black panel was 63° C. and the humidity was 70% to conduct the tests of anti-fogging property, water resistance and adhesion as described above.

[Transparency]

The transparency of an anti-fogging article sample was visually observed and ranked in accordance with the following standard:

A: Transparent;

B: Somewhat colored and/or clouded;

C: Colored and/or clouded.

TABLE 1

|  | Initial | | | | After 100-hour exposure to ultraviolet light | | |
| --- | --- | --- | --- | --- | --- | --- | --- |
|  | Anti-fogging property | Water resistance | Adhesion | Transparency | Anti-fogging property | Water resistance | Adhesion |
| Ex. 1 | A | A | A | A | A | A | A |
| Ex. 2 | A | A | A | A | A | A | A |
| Ex. 3 | A | A | A | A | A | A | A |
| Ex. 4 | A | A | A | A | A | A | A |
| Ex. 5 | A | A | A | A | A | A | A |
| Comp. Ex. 1 | A | A | C | C | B | B | C |
| Comp. Ex. 2 | B | B | B | A | C | C | C |
| Comp. Ex. 3 | A | A | C | C | B | B | C |

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An anti-fogging article comprising a base material and an anti-fogging coating film comprising a hydrophilic polymer and a benzophenone compound represented by a general formula (I):

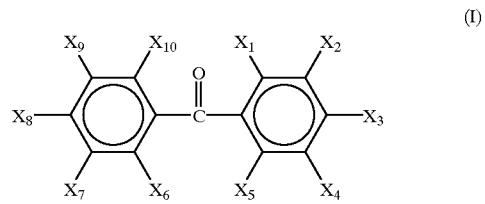

wherein $X_1$ to $X_{10}$ are the same or different from one another and are individually a radical selected from the group consisting of hydrogen, hydroxyl group, sulfonic group, carboxyl group, acyl group, ester group, ether group, hydrocarbon groups, alkoxyl groups having 1 to 6 carbon atoms, amino group, hydroxyalkyl groups and hydroxyalkoxyl groups, with the proviso that at least one of $X_1$ to $X_{10}$ is a radical selected from among the hydroxyl and sulfonic groups.

2. The anti-fogging article according to claim 1, wherein at least one of $X_1$, $X_5$, $X_6$ and $X_{10}$ in the benzophenone compound represented by the general formula (I) is a hydroxyl group.

3. The anti-fogging article according to claim 1, wherein the benzophenone compound represented by the general formula (I) has solubility of at least 5% by weight (at 25° C.) in water or at least 5% by weight (at 25° C.) in alcohol.

4. The anti-fogging article according to claim 1, wherein the benzophenone compound represented by the general formula (I) has solubility of at least 10% by weight (at 25° C.) in methanol.

5. The anti-fogging article according to claim 1, wherein the benzophenone compound is contained in an amount of from 0.01 to 10 parts by weight based on 100 parts by weight of the hydrophilic polymer.

6. The anti-fogging article according to claim 1, which further comprises a 2,2,6,6-tetramethyl-4-piperidine type hindered amine compound.

7. The anti-fogging article according to claim 6, wherein the 2,2,6,6-tetramethyl-4-piperidine type hindered amine compound has solubility of at least 5% by weight (at 25° C.) in water or at least 5% by weight (at 25° C.) in alcohol.

8. The anti-fogging article according to claim 7, wherein the 2,2,6,6-tetramethyl-4 -piperidine type hindered amine compound has solubility of at least 10% by weight (at 25° C.) in methanol.

9. The anti-fogging article according to claim 6, wherein the benzophenone compound and the 2,2,6,6-tetramethyl-4-piperidine type hindered amine compound are contained in amounts of from 0.01 to 10 parts by weight and from 0.01 to 10 parts by weight, respectively, based on 100 parts by weight of the hydrophilic polymer.

10. The anti-fogging article according to claim 1, wherein the base material is selected from the group consisting of glass, plastic and metal.

* * * * *

UNITED STATES PATENT AND TRADEMARK OFFICE
CERTIFICATE OF CORRECTION

PATENT NO. : 6,117,919

DATED : September 12, 2000

INVENTOR(S) : MIHOKO ODA ET AL.

It is certified that error appears in the above-identified patent and that said Letters Patent is hereby corrected as shown below:

Col. 1, line 54, "Is" (second occurrence) should be deleted;

Col. 6, line 42, "is" should read --are--.

Signed and Sealed this

Twenty-fourth Day of April, 2001

Attest:

NICHOLAS P. GODICI

Attesting Officer

Acting Director of the United States Patent and Trademark Office